US012764092B2

(12) United States Patent
K et al.

(10) Patent No.: US 12,764,092 B2
(45) Date of Patent: Oct. 13, 2026

(54) PREFIX DELEGATION REQUESTS FOR DEVICE-LEVEL POLICY ENFORCEMENT

(71) Applicant: Juniper Networks, Inc., Sunnyvale, CA (US)

(72) Inventors: Kiran Kumar K, Bangalore (IN); Venkatesh Padebettu, Bangalore (IN); Jayadev H R, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 41 days.

(21) Appl. No.: 18/972,062

(22) Filed: Dec. 6, 2024

(65) Prior Publication Data

US 2026/0163861 A1 Jun. 11, 2026

(51) Int. Cl.

*H04L 61/5007* (2022.01)
*H04L 12/66* (2006.01)
*H04L 101/695* (2022.01)

(52) U.S. Cl.

CPC .......... *H04L 61/5007* (2022.05); *H04L 12/66* (2013.01); *H04L 2101/695* (2022.05)

(58) Field of Classification Search

CPC ................ H04L 61/5007; H04L 12/66; H04L 2101/695

See application file for complete search history.

(56) References Cited

U.S. PATENT DOCUMENTS

| | | | | |
|---|---|---|---|---|
| 8,615,017 B2 | 12/2013 | Kato et al. | | |
| 8,953,601 B2 | 2/2015 | Kaippallimalil et al. | | |
| 10,432,579 B2 * | 10/2019 | Liang | H04L 45/52 | |
| 2004/0165602 A1 * | 8/2004 | Park | H04L 61/2532 | 370/466 |
| 2005/0030956 A1 * | 2/2005 | Lord | H04L 61/2592 | 370/401 |
| 2010/0332626 A1 * | 12/2010 | Jonsson | H04L 45/00 | 709/238 |
| 2013/0301650 A1 * | 11/2013 | Zou | H04L 61/2514 | 370/467 |
| 2014/0215038 A1 * | 7/2014 | Donley | H04L 41/0213 | 709/223 |
| 2018/0054415 A1 * | 2/2018 | Liang | H04L 12/5691 | |
| 2023/0412506 A1 * | 12/2023 | Zhang | H04L 45/42 | |
| 2024/0340239 A1 * | 10/2024 | Zhu | H04L 45/741 | |

FOREIGN PATENT DOCUMENTS

KR 101311198 B1 2/2012

* cited by examiner

*Primary Examiner* — Mohamed A. Wasel
(74) *Attorney, Agent, or Firm* — Harrity & Harrity, LLP

(57) ABSTRACT

A network device may generate a request for an Internet protocol version 4 (IPv4) prefix and a wide area network (WAN) IP address, and may include, in the request, a prefix delegation option identifying a prefix identifier and a prefix length of the IPv4 prefix. The network device may provide the request to a server device, and may receive, based on the request, the WAN IP address, the IPv4 prefix, and IPv4 prefix lease parameters determined based on the prefix delegation option. The network device may assign an IPv4 address, based on the IPv4 prefix, to an interface of the network device communicating with endpoint devices, and may assign other IPv4 addresses, based on the IPv4 prefix, to the endpoint devices.

20 Claims, 10 Drawing Sheets

100

| | |
|---|---|
| Option code | Length |
| Prefix ID (4 bytes) | T1 (4 bytes) |
| T2 (4 bytes) | Requested prefix length (1 byte) |
| Assigned prefix length (1 byte) | IPv4 prefix (4 bytes) |
| Preferred lifetime (4 bytes) | Valid lifetime (4 bytes) |

FIG. 1F

PREFIX DELEGATION REQUESTS FOR DEVICE-LEVEL POLICY ENFORCEMENT

BACKGROUND

The dynamic host configuration protocol (DHCP) is a network management protocol used on Internet protocol (IP) networks for automatically assigning IP addresses and other communication parameters to devices connected to the network using a client-server architecture.

SUMMARY

Some implementations described herein relate to a method. The method may include generating a request for an IP version 4 (IPv4) prefix and a wide area network (WAN) IP address, and including, in the request, a prefix delegation option identifying a prefix identifier and a prefix length of the IPv4 prefix. The method may include providing the request to a server device, and receiving, based on the request, the WAN IP address, the IPv4 prefix, and IPv4 prefix lease parameters determined based on the prefix delegation option. The method may include assigning an IPv4 address, based on the IPv4 prefix, to an interface of the network device communicating with endpoint devices, and assigning other IPv4 addresses, based on the IPv4 prefix, to the endpoint devices.

Some implementations described herein relate to a network device. The network device may include one or more memories and one or more processors. The one or more processors may be configured to generate a request for an IPv4 prefix and a WAN IP address, and include, in the request, a prefix delegation option identifying a prefix identifier and a prefix length of the IPv4 prefix. The one or more processors may be configured to provide the request to a server device, and receive, based on the request, the WAN IP address, the IPv4 prefix, and IPv4 prefix lease parameters determined based on the prefix delegation option. The one or more processors may be configured to configure an interface of the network device, communicating with endpoint devices, with the IPv4 prefix, and assign an IPv4 address, based on the IPv4 prefix, to the interface of the network device communicating with endpoint devices. The one or more processors may be configured to assign other IPv4 addresses, based on the IPv4 prefix, to the endpoint devices.

Some implementations described herein relate to a non-transitory computer-readable medium that stores a set of instructions. The set of instructions, when executed by one or more processors of a network device, may cause the network device to generate a request for an IPv4 prefix and a WAN IP address, and include, in the request, a prefix delegation option identifying a prefix identifier and a prefix length of the IPv4 prefix. The set of instructions, when executed by one or more processors of the network device, may cause the network device to provide the request to a server device, and receive, based on the request, the WAN IP address, the IPv4 prefix, and IPv4 prefix lease parameters determined based on the prefix delegation option. The set of instructions, when executed by one or more processors of the network device, may cause the network device to provide confirmation of acceptance of the WAN IP address and the IPv4 prefix to the server device, and receive, from the server device and based on the confirmation, an indication of assignment of the WAN IP address and the IPv4 prefix. The set of instructions, when executed by one or more processors of the network device, may cause the network device to assign an IPv4 address, based on the IPv4 prefix, to an interface of the network device communicating with endpoint devices, and assign other IPv4 addresses, based on the IPv4 prefix, to the endpoint devices.

BRIEF DESCRIPTION OF THE DRAWINGS

FIGS. 1A-1F are diagrams of an example associated with providing prefix delegation requests for device-level policy enforcement.

DETAILED DESCRIPTION

Figure 1A:
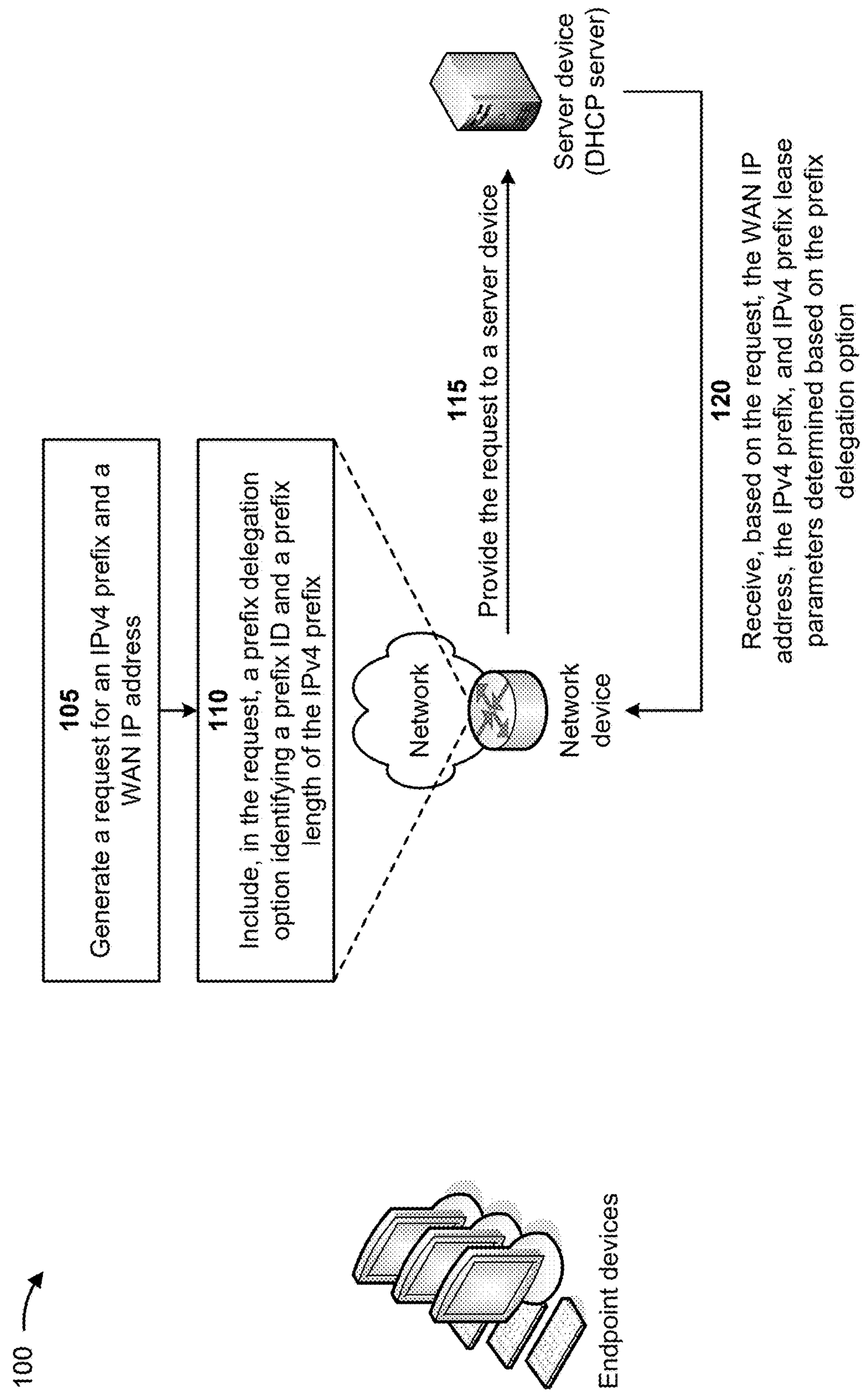

The following detailed description of example implementations refers to the accompanying drawings. The same reference numbers in different drawings may identify the same or similar elements.

Current client-server architectures for DHCP provide a network device (e.g., a broadband network gateway) between endpoint devices (e.g., clients) and a server device (e.g., a DHCP server). The network device may support a large quantity (e.g., thousands) of endpoint devices, and may need to identify the endpoint devices for particular network deployments (e.g., an IP version 4 (IPv4) network deployment). IPv4 may be utilized by the network device to route traffic associated with the endpoint devices. However, there is no prefix delegation mechanism for IPv4, which prevents the network device from identifying the endpoint devices in an IPv4 network deployment. Thus, current techniques for providing client-server architectures for DHCP consume computing resources (e.g., processing resources, memory resources, communication resources, and/or the like), networking resources, and/or the like, associated with failing to identify endpoint devices for IPv4 network deployments, failing to enforce policies (e.g., via firewall filters) on the endpoint devices based on failing to identify the endpoint devices, handling network attacks based on failing to enforce policies on the endpoint devices, and/or the like.

Some implementations described herein relate to a network device that provides prefix delegation requests for device-level policy enforcement. For example, a network device may generate a request for an IPv4 prefix and a wide area network (WAN) IP address, and may include, in the request, a prefix delegation option identifying a prefix identifier and a prefix length of the IPv4 prefix. The network device may provide the request to a server device, and may receive, based on the request, the WAN IP address, the IPv4 prefix, and IPv4 prefix lease parameters determined based on the prefix delegation option. The network device may assign an IPv4 address, based on the IPv4 prefix, to an interface of the network device communicating with endpoint devices, and may assign other IPv4 addresses, based on the IPv4 prefix, to the endpoint devices.

In this way, the network device provides prefix delegation requests for device-level policy enforcement. For example, the network device may generate a request for an IPv4 prefix, and may include, in the request, a prefix delegation option identifying a prefix identifier and a prefix length of the IPv4 prefix. The network device may provide the request to a server device, and may receive, from the server device, the IPv4 prefix and IPv4 prefix lease parameters determined based on the prefix delegation option. The network device may assign an IPv4 address, based on the IPv4 prefix, to an interface of the network device, and may assign other IPv4 addresses, based on the IPv4 prefix, to the endpoint devices (e.g., to identify the endpoint devices). The network device may also cause policies to be applied to the endpoint devices based on the IPv4 prefix. Thus, the network device conserves computing resources, networking resources, and/or the like that would otherwise have been consumed by failing to identify endpoint devices for IPv4 network deployments, failing to enforce policies (e.g., via firewall filters) on the endpoint devices based on failing to identify the endpoint devices, handling network attacks based on failing to enforce policies on the endpoint devices, and/or the like.

FIGS. 1A-1F are diagrams of an example 100 associated with providing prefix delegation requests for device-level policy enforcement. As shown in FIGS. 1A-1F, example 100 includes a plurality of endpoint devices, a server device, and a network with a network device. In some implementations, the endpoint devices may correspond to DHCP clients, the network device may correspond to a broadband network gateway (BNG), and the server device may correspond to a DHCP server. Further details of the endpoint devices, the server device, the network, and the network device are provided elsewhere herein.

As shown in FIG. 1A, and by reference number 105, a network device may generate a request for an IP version 4 (IPv4) prefix and a wide area network (WAN) IP address. For example, the server device may be configured to support a pool of IPv4 prefixes that can be delegated to network devices. The server device may also be configured with a pool of IPv4 addresses for WAN IP addresses of the network devices. The network device may generate a DHCP discover message that includes a request for an IPv4 prefix and a WAN IP address. In some implementations, the DHCP discover message may part of a discover, offer, request, and acknowledge (DORA) process.

As further shown in FIG. 1A, and by reference number 110, the network device may include, in the request, a prefix delegation option identifying a prefix identifier (ID) and a prefix length of the IPv4 prefix. For example, the DHCP discover message may include a custom option (e.g., a prefix delegation option) that identifies a prefix ID and prefix length of the IPv4 prefix. In some implementations, the request with the prefix delegation option may include the following example syntax:

```
DHCP
  Message type: Discover
  Transaction ID: 0x12345678
  Client Identifier
  Option: Prefix Delegation
    Prefix ID: 0x00000001
    Requested Prefix Length: 24.
```

As further shown in FIG. 1A, and by reference number 115, the network device may provide the request to a server device. For example, after generating the DHCP discover message, the network device may provide the DHCP discover message to the server device, and the server device may receive the DHCP discover message. The DHCP discover message may indicate, to the server device, a need of the network device for an IPv4 prefix and a WAN IP address. The prefix delegation option may specify, to the server device, the prefix ID and the prefix length of the IPv4 prefix.

As further shown in FIG. 1A, and by reference number 120, the network device may receive, based on the request, the WAN IP address, the IPv4 prefix, and IPv4 prefix lease parameters determined based on the prefix delegation option. For example, the server device may generate a DHCP offer message based on the DHCP discover message. The DHCP offer message may include the WAN IP address, the IPv4 prefix, and IPv4 prefix lease parameters. The server device may determine the IPv4 prefix lease parameters based on the prefix ID and the prefix length of the IPv4 prefix specified in the prefix delegation option. The IPv4 prefix lease parameters may include an IP address lease time, a renewal time value, a rebinding time value, and/or the like. The server device may provide the DHCP offer message, with the WAN IP address, the IPv4 prefix, and IPv4 prefix lease parameters, to the network device, and the network device may receive the DHCP offer message with the WAN IP address, the IPv4 prefix, and IPv4 prefix lease parameters. In one example, the DHCP offer message may include the following syntax:

```
DHCP
  Message type: Offer
  Transaction ID: 0x12345678
  yiaddr: 192.168.1.10 (WAN IP address)
  Client Identifier
  Option: Prefix Delegation
    Prefix ID: 0x00000001
    T1: 3600
    T2: 5400
    Requested Prefix Length: 24
    Assigned Prefix Length: 24
    IPv4 Prefix: 192.168.1.0
    Preferred Lifetime: 7200
    Valid Lifetime: 14400
  Option: IP Address Lease Time (WAN IP lease parameters)
    Lease Time: 14400
  Option: Renewal Time Value
    Renewal Time: 3600
  Option: Rebinding Time Value
    Rebinding Time: 5400.
```

Figure 1B:
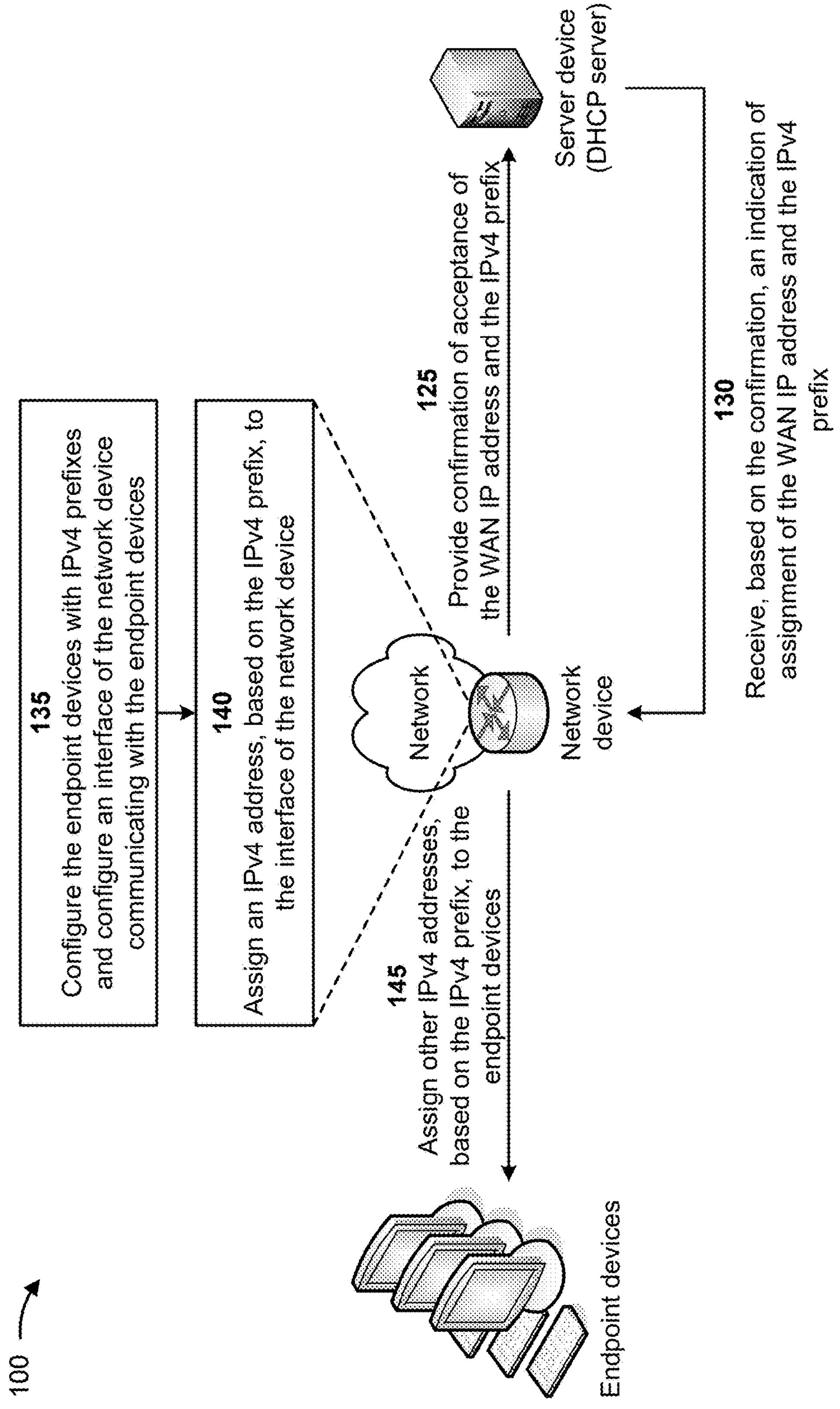

As shown in FIG. 1B, and by reference number 125, the network device may provide confirmation of acceptance of the WAN IP address and the IPv4 prefix. For example, if the network device accepts the WAN IP address, the IPv4 prefix, and IPv4 prefix lease parameters included in the DHCP offer message, the network device may generate a DHCP request message. The DHCP request message may include information confirming acceptance of the WAN IP address and the IPv4 prefix offered by the server device. The network device may provide the DHCP request message to the server device, and the server device may receive the DHCP request message.

As further shown in FIG. 1B, and by reference number 130, the network device may receive, based on the confirmation, an indication of assignment of the WAN IP address and the IPv4 prefix. For example, the server device may assign the WAN IP address and the IPv4 prefix to the network device based on receiving the DHCP request message. The server device may also generate a DHCP acknowledgement message based on receiving the DHCP request message. The DHCP acknowledgement message may acknowledge assignment of the WAN IP address and the IPv4 prefix to the network device. The server device may provide the DHCP acknowledgement message to the network device, and the network device may receive the DHCP acknowledgement message.

As further shown in FIG. 1B, and by reference number 135, the network device may configure the endpoint devices with IPv4 prefixes and may configure an interface of the network device, communicating with the endpoint devices, with the IPv4 prefix. For example, after receiving the DHCP acknowledgement message, the network device may configure a network interface with the IPv4 prefix assigned to the network device. In some implementations, the network interface may include an interface providing a communication link between the network device and the endpoint devices. The network device may also configure the endpoint devices with IPv4 prefixes.

As further shown in FIG. 1B, and by reference number 140, the network device may assign an IPv4 address, based on the IPv4 prefix, to the interface of the network device. For example, the network device may generate IPv4 addresses based on the IPv4 prefix, and may assign the IPv4 addresses to one or more components of the network device. In some implementations, the network device may assign one of the IPv4 addresses to the interface of the network device communicating with the endpoint devices. The interface of the network device may serve as a default gateway for one or more components of the network device.

As further shown in FIG. 1B, and by reference number 145, the network device may assign other IPv4 addresses, based on the IPv4 prefix, to the endpoint devices. For example, after assigning the one of the IPv4 addresses to the interface, the network device may assign the remaining IPv4 addresses to the endpoint devices and may configure the endpoint devices with the remaining IPv4 addresses. The network device may act as a DHCP local server for the endpoint devices assigned IPv4 addresses. In some implementations, the network device may assign all of the IPv4 addresses to the endpoint devices and each endpoint device may be associated with an IPv4 address. Alternatively, the network device may assign all of the IPv4 addresses to the endpoint devices but there may be additional endpoint devices that are not assigned an IPv4 address.

Figure 1C:
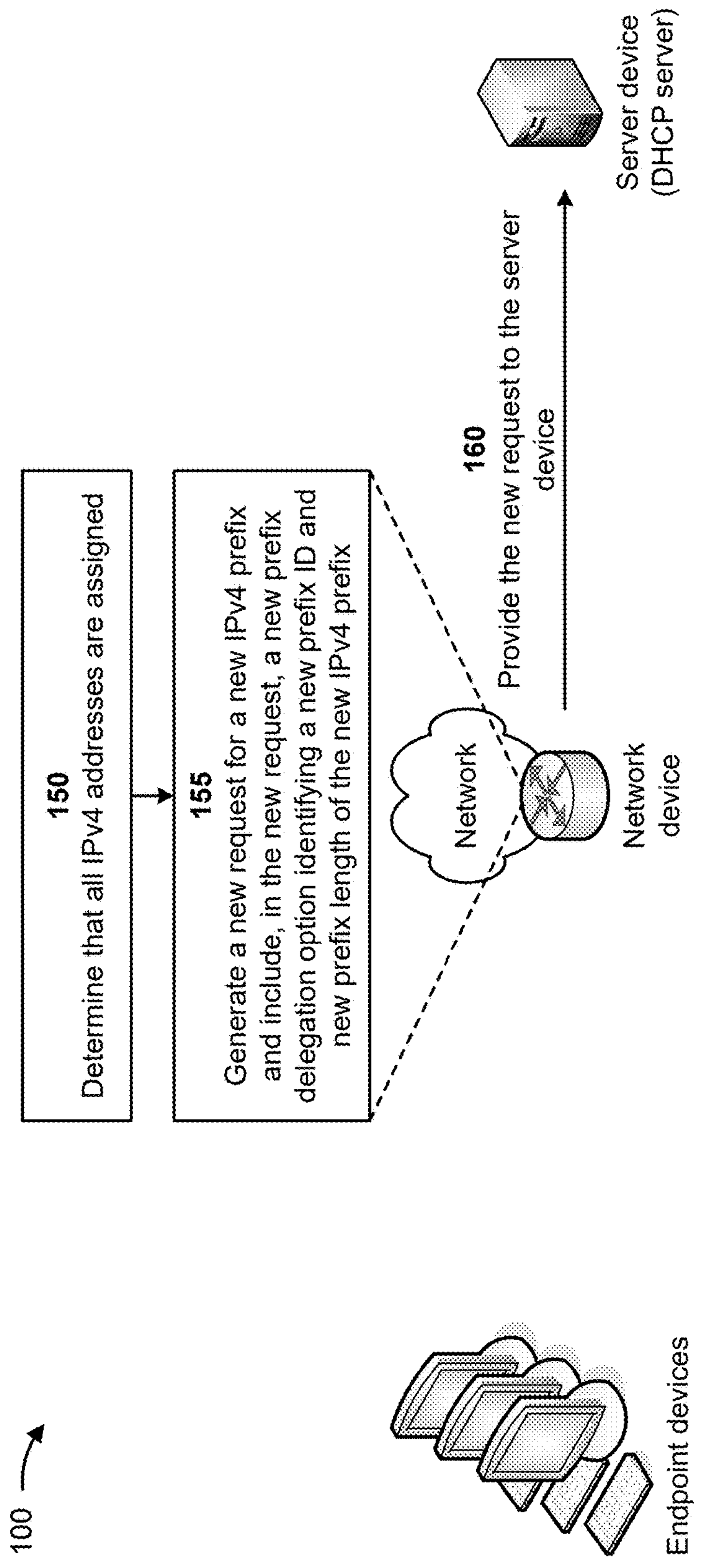

As shown in FIG. 1C, and by reference number 150, the network device may determine that all IPv4 addresses based on the IPv4 prefix are assigned. For example, the network device may determine whether the IPv4 addresses, generated based on the IPv4 prefix, have been assigned. In some implementations, the network device may determine that all IPv4 addresses based on the IPv4 prefix are assigned when no IPv4 addresses remain. Alternatively, the network device may determine that not all of the IPv4 addresses are assigned when one or more IPv4 addresses remain available for assignment.

As further shown in FIG. 1C, and by reference number 155, the network device may generate a new request for a new IPv4 prefix and may include, in the new request, a new prefix delegation option identifying a new prefix ID and a new prefix length of the new IPv4 prefix. For example, when the network device determines that all IPv4 addresses based on the IPv4 prefix are assigned, the network device may generate a new DHCP discover message that includes a request for a new IPv4 prefix. When the network device requests the new IPv4 prefix upon exhaustion of the IPv4 addresses based on the IPv4 prefix, the WAN IP address assigned to the network device may remain unchanged. Thus, the DHCP discover message may not include a request for a new WAN IP address. If the WAN IP address and multiple IPv4 prefixes have different lease times, the network device may renew, rebind, and release the multiple IPv4 prefixes separately as per respective lease parameters. In some implementations, the new DHCP discover message may part of a new DORA process. The new DHCP discover message may include a custom option (e.g., a new prefix delegation option) that identifies a new prefix ID and a new prefix length of the new IPv4 prefix.

As further shown in FIG. 1C, and by reference number 160, the network device may provide the new request to the server device. For example, after generating the new DHCP discover message, the network device may provide the new DHCP discover message to the server device, and the server device may receive the new DHCP discover message. The new DHCP discover message may indicate, to the server device, a need of the network device for a new IPv4 prefix. The prefix delegation option may specify, to the server device, the new prefix ID and the new prefix length of the new IPv4 prefix. The network device may receive, based on the new DHCP discover message, a new DHCP offer message that includes the new IPv4 prefix and new IPv4 prefix lease parameters determined based on the new prefix delegation option. The network device may continue with the new DORA process as described above in connection with FIG. 1B.

Figure 1D:
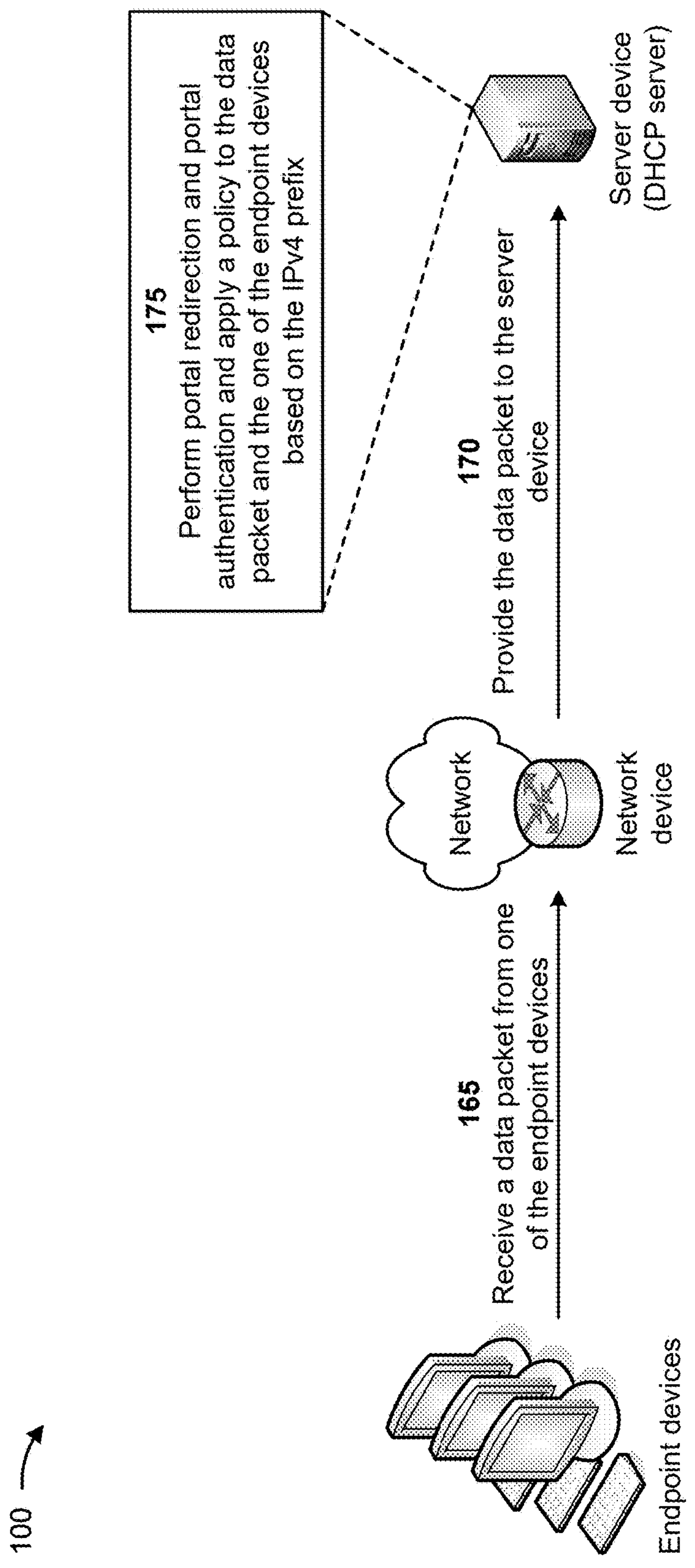

As shown in FIG. 1D, and by reference number 165, the network device may receive a data packet from one of the endpoint devices. For example, after assigning the other IPv4 addresses (e.g., based on the IPv4 prefix) to the endpoint devices, one of the endpoint devices may generate a data packet. The endpoint device may provide the data packet to the network device, and the network device may receive the data packet. In some implementations, the data packet may be associated with the IPv4 prefix since the endpoint device is associated with an IPv4 address generated based on the IPv4 prefix.

As further shown in FIG. 1D, and by reference number 170, the network device may provide the data packet to the server device. For example, when the network device receives the IPv4 prefix, the network device may activate portal redirection services for data packets associated with the IPv4 prefix. The network device may determine that the data packet is associated with the IPv4 prefix since the endpoint device (e.g., that generated the data packet) is associated with an IPv4 address generated based on the IPv4 prefix. The network device may provide the data packet to the server device based on determining that the data packet is associated with the IPv4 prefix.

As further shown in FIG. 1D, and by reference number 175, the server device may perform portal redirection and portal authentication, and may apply a policy to the data packet and the one of the endpoint devices based on the IPv4 prefix. For example, the server device may receive the data packet from the network device, and may perform portal redirection and portal authentication for the data packet since the data packet is associated with the IPv4 prefix. The server device may apply a policy (e.g., a firewall policy that defines acceptable and unacceptable traffic based on various factors such as IP addresses, port numbers, protocols, and specific types of data) to the data packet and/or to all data packets received from the one of the endpoint devices. In some implementations, the server device may apply an individual policer to the endpoint device to enable device-level policy enforcement.

Figure 1E:
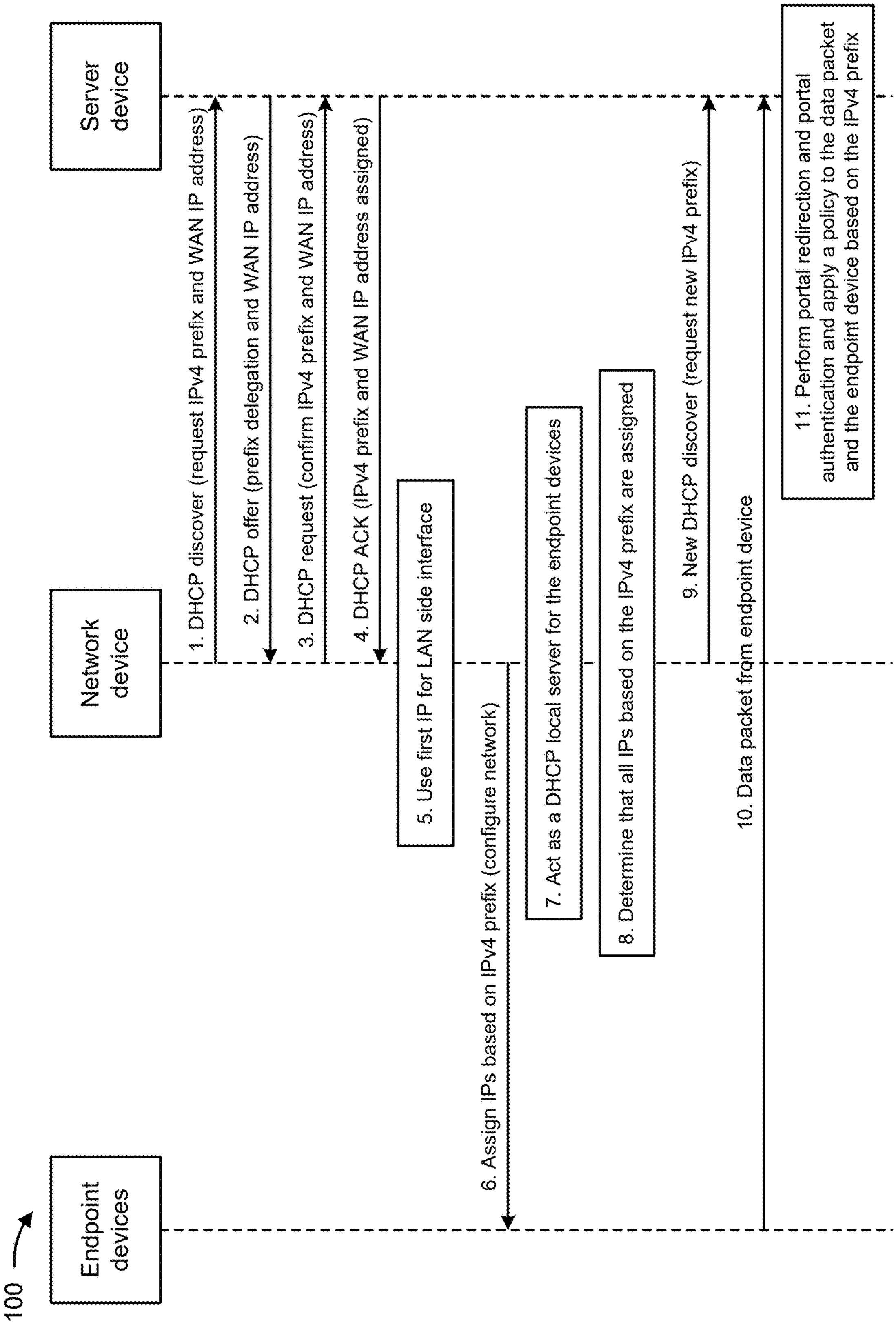

FIG. 1E is an information flow diagram describing interactions between the plurality of endpoint devices, the network device, and the server device. As shown at step 1 of FIG. 1E, the network device may provide a DHCP discover message to the server device. For example, the DHCP discover message may include a request for an IPv4 prefix and a WAN IP address. The request may include a prefix delegation option identifying a prefix ID and a prefix length of the IPv4 prefix. As shown at step 2, the network device may receive, from the server device, a DHCP offer message. For example, the DHCP offer message may include the IPv4 prefix and the WAN IP address delegated by the server device. As shown at step 3, the network device may provide a DHCP request message to the server device. For example, the DHCP request message may include a confirmation of the IPv4 prefix and the WAN IP address proposed by the server device.

As shown at step 4, the network device may receive, from the server device, a DHCP acknowledgment message. For example, the DHCP acknowledgment message may indicate that the IPv4 prefix and the WAN IP address have been assigned to the network device. As shown at step 5, the network device may utilize a first IP address (e.g., generated based on the IPv4 prefix) for a LAN side interface of the network device (e.g., an interface communicating with the endpoint devices). As shown at step 6, the network device may assign IP addresses (e.g., generated based on the IPv4 prefix) to the endpoint devices. For example, by assigning the IP addresses to the endpoint devices, the network device may configure a network for the endpoint devices. As shown at step 7, the network device may act as a DHCP local server for the endpoint devices. For example, once the IP addresses are assigned to the endpoint devices, the network device may function as a DHCP local server for the endpoint devices.

As shown at step 8 of FIG. 1E, the network device may determine that all IP addresses based on the IPv4 prefix have been assigned to endpoint devices. As shown at step 9, the network device may provide a new DHCP discover message to the server device. For example, the network device may generate the new DHCP discover message when all IP addresses based on the IPv4 prefix have been assigned and additional endpoint devices require IP address assignments. The new DHCP discover message may include a request for a new IPv4 prefix.

As shown at step 10 of FIG. 1E, the network device and the server device may receive a data packet from an endpoint device. For example, after the endpoint device is assigned an IP address, the endpoint device may generate the data packet and may provide the data packet to the network device. The network device may provide the data packet to the server device. As shown at step 11, the server device may perform portal redirection and portal authentication and may apply a policy to the data packet and the endpoint device based on the IPv4 prefix. For example, the server device may apply the policy to the data packet and the endpoint device via a firewall filter and/or a policer.

FIG. 1F depicts example syntax associated with the prefix delegation option. As shown, the prefix delegation option may include an option code field, a length field, a prefix ID field, a first time interval (T1) field, a second time interval (T2) field, a requested prefix length field, an assigned prefix length field, an IPv4 prefix field, a preferred lifetime field, and a valid lifetime field.

The option code field may include a unique code assigned to the prefix delegation option. The length field may include a total length of the prefix delegation option in bytes and excluding the option code and length fields. The prefix ID field may include an identity association identifier that is unique for the prefix delegation option. The first time interval field may include a renewal time interval (e.g., in seconds) after which the network device should start to renew the IPv4 prefix. The second time interval field may include a rebinding time interval (e.g., in seconds) after which the network device should start to rebind the IPv4 prefix. The requested prefix length field may include a length of the IPv4 prefix in bits and as requested by the network device. The assigned prefix length field may include a length of the IPv4 prefix in bits and as offered by the server device. The IPv4 prefix field may include the delegated IPv4 prefix. The preferred lifetime field may include a time interval (e.g., in seconds) during which the IPv4 prefix is preferred. The valid lifetime field may include a time interval (e.g., in seconds) during which the IPv4 prefix is valid.

In this way, the network device provides prefix delegation requests for device-level policy enforcement. For example, the network device may generate a request for an IPv4 prefix, and may include, in the request, a prefix delegation option identifying a prefix identifier and a prefix length of the IPv4 prefix. The network device may provide the request to a server device, and may receive, from the server device, the IPv4 prefix and IPv4 prefix lease parameters determined based on the prefix delegation option. The network device may assign an IPv4 address, based on the IPv4 prefix, to an interface of the network device, and may assign other IPv4 addresses, based on the IPv4 prefix, to the endpoint devices (e.g., to identify the endpoint devices). The network device may also cause policies to be applied to the endpoint devices based on the IPv4 prefix. Thus, the network device conserves computing resources, networking resources, and/or the like that would otherwise have been consumed by failing to identify endpoint devices for IPv4 network deployments, failing to enforce policies (e.g., via firewall filters) on the endpoint devices based on failing to identify the endpoint devices, handling network attacks based on failing to enforce policies on the endpoint devices, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
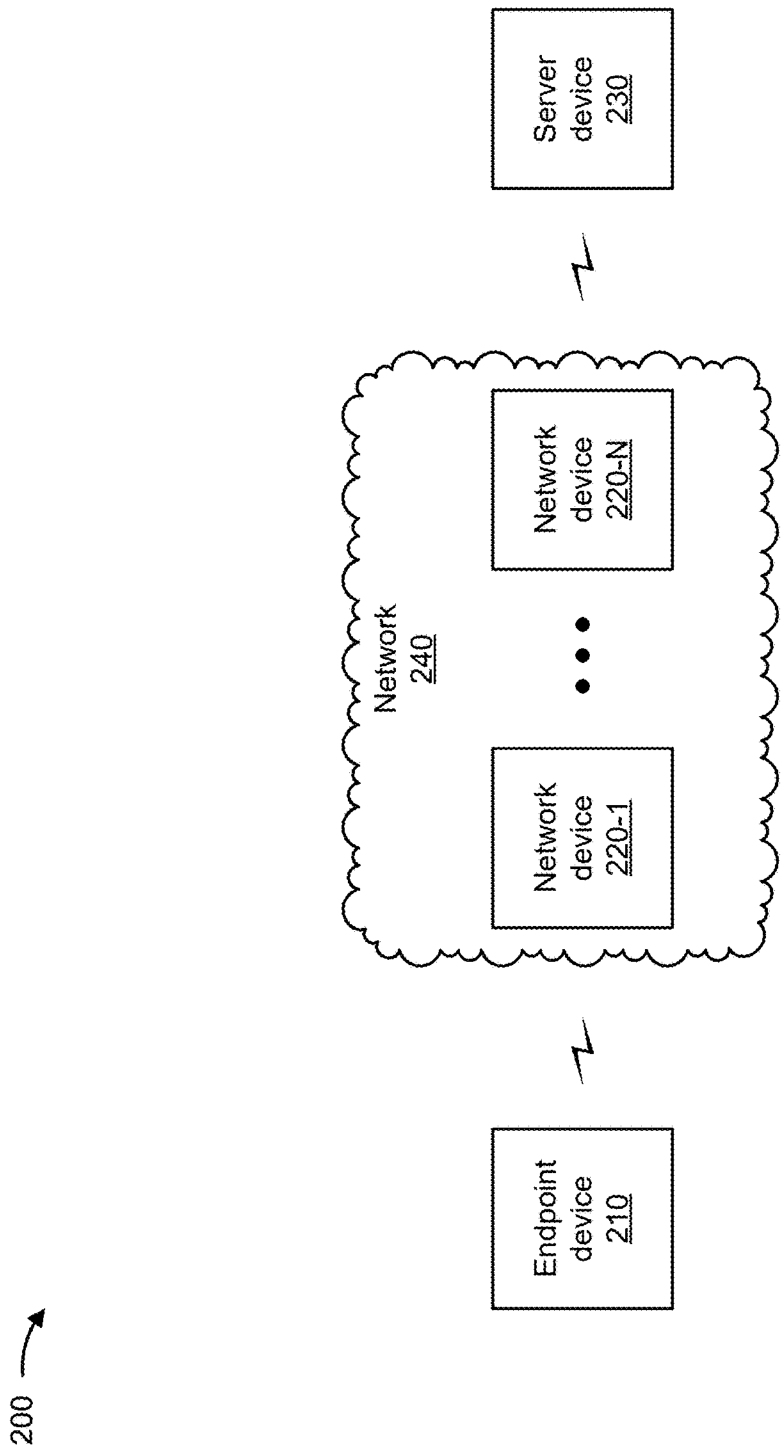
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include endpoint devices 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a set-top box, a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device (e.g., a router, a residential gateway, and/or the like), or a similar type of device. In some implementations, the endpoint device 210 may receive network traffic from and/or may provide network traffic to the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, and/or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
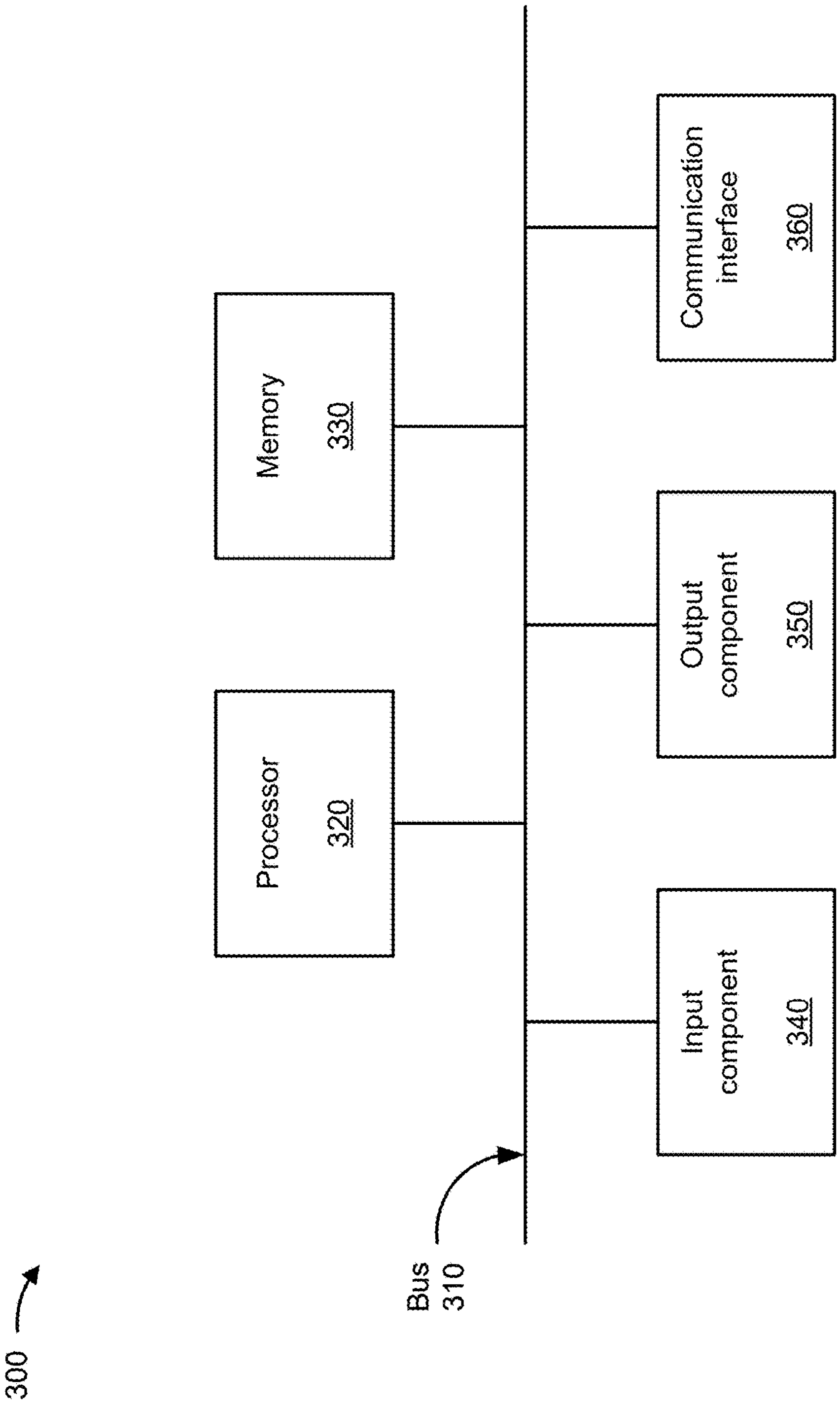
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
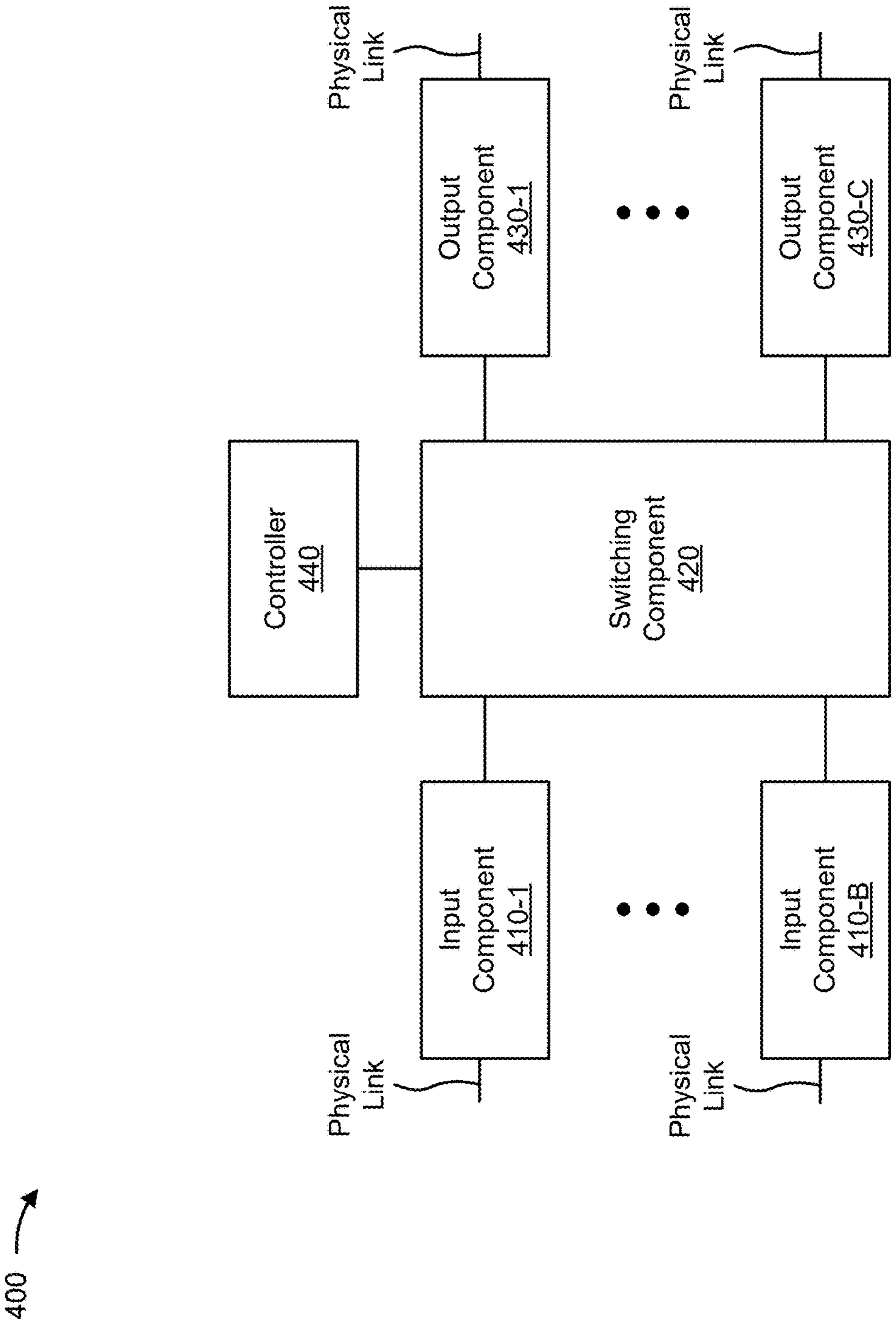

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
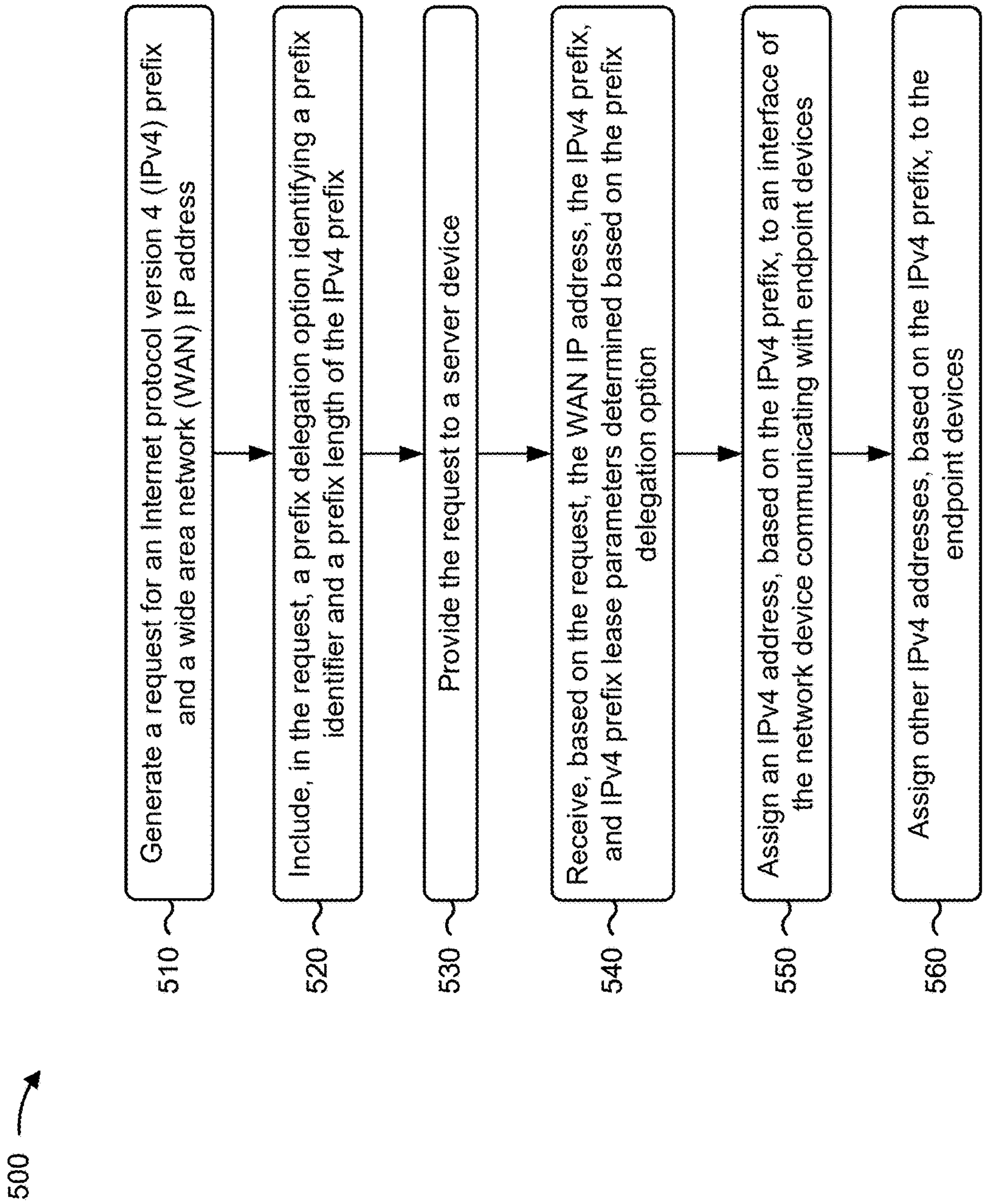
FIG. 5 is a flowchart of an example process for providing prefix delegation requests for device-level policy enforcement.

FIG. 5 is a flowchart of an example process 500 for providing prefix delegation requests for device-level policy enforcement. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include generating a request for an IPv4 prefix and a WAN IP address (block 510). For example, the network device may generate a request for an IPv4 prefix and a WAN IP address, as described above. In some implementations, the network device is a BNG. In some implementations, the request is a DHCP DORA request.

As further shown in FIG. 5, process 500 may include including, in the request, a prefix delegation option identifying a prefix identifier and a prefix length of the IPv4 prefix (block 520). For example, the network device may include, in the request, a prefix delegation option identifying a prefix identifier and a prefix length of the IPv4 prefix, as described above. In some implementations, the prefix delegation option includes an option code field, a length field, a prefix identifier field, a renewal time interval field, a rebinding time interval field, a requested prefix length field, an assigned prefix length field, an IPv4 prefix field, a preferred lifetime field, and a valid lifetime field. In some implementations, the option code field includes a code assigned to the prefix delegation option, and the prefix identifier field includes an identity association identifier for the prefix delegation option. In some implementations, the renewal time interval includes a time interval after which the network device is to renew the IPv4 prefix, and the rebinding time interval includes a time interval after which the network device is to rebind the IPv4 prefix.

As further shown in FIG. 5, process 500 may include providing the request to a server device (block 530). For example, the network device may provide the request to a server device, as described above. In some implementations, the server device is a DHCP server.

As further shown in FIG. 5, process 500 may include receiving, based on the request, the WAN IP address, the IPv4 prefix, and IPv4 prefix lease parameters determined based on the prefix delegation option (block 540). For example, the network device may receive, based on the request, the WAN IP address, the IPv4 prefix, and IPv4 prefix lease parameters determined based on the prefix delegation option, as described above.

As further shown in FIG. 5, process 500 may include assigning an IPv4 address, based on the IPv4 prefix, to an interface of the network device communicating with endpoint devices (block 550). For example, the network device may assign an IPv4 address, based on the IPv4 prefix, to an interface of the network device communicating with endpoint devices, as described above.

As further shown in FIG. 5, process 500 may include assigning other IPv4 addresses, based on the IPv4 prefix, to the endpoint devices (block 560). For example, the network device may assign other IPv4 addresses, based on the IPv4 prefix, to the endpoint devices, as described above.

In some implementations, process 500 includes determining that all IPv4 addresses based on the IPv4 prefix are assigned and that additional endpoint devices require IPv4 addresses, generating a new request for a new IPv4 prefix based on determining that all IPv4 addresses based on the IPv4 prefix are assigned and that the additional endpoint devices require IPv4 addresses, including, in the new request, a new prefix delegation option identifying a new prefix identifier and a new prefix length of the new IPv4 prefix, and providing the new request to the server device. In some implementations, process 500 includes receiving, based on the new request, the new IPv4 prefix and a new IPv4 prefix lease parameters determined based on the new prefix delegation option, and assigning new IPv4 addresses, based on the new IPv4 prefix, to the additional endpoint devices.

In some implementations, process 500 includes providing confirmation of acceptance of the WAN IP address and the IPv4 prefix to the server device, and receiving, from the server device and based on the confirmation, an indication of assignment of the WAN IP address and the IPv4 prefix. In some implementations, process 500 includes configuring the endpoint devices with the IPv4 prefixes.

In some implementations, process 500 includes receiving a data packet from one of the endpoint devices, providing the data packet to the server device, and causing a policy to be applied to the data packet and the one of the endpoint devices based on providing the data packet to the server device. In some implementations, the IPv4 prefix causes the network device to activate portal redirection services for data packets associated with the IPv4 prefix.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

generating, by a network device, a request for an Internet protocol version 4 (IPv4) prefix and a wide area network (WAN) IP address;

including, by the network device and in the request, a prefix delegation option identifying a prefix identifier and a prefix length of the IPV4 prefix;

providing, by the network device, the request to a server device;

receiving, by the network device and based on the request, the WAN IP address, the IPV4 prefix, and IPv4 prefix lease parameters determined based on the prefix delegation option;

generating a plurality of IPV4 addresses based on the IPV4 prefix;

assigning, by the network device, a first IPV4 address of a plurality of IPV4 addresses to an interface of the network device communicating with one or more endpoint devices; and assigning, by the network device, one or more second IPv4 addresses of the plurality of IPV4 addresses to the one or more endpoint devices, wherein the network device acts as a dynamic host configuration protocol (DHCP) local server for the one or more endpoint devices.

2. The method of claim 1, wherein the network device is a broadband network gateway.

3. The method of claim 1, wherein the server device is a dynamic host configuration protocol server.

4. The method of claim 1, further comprising:

determining that all IPv4 addresses based on the IPV4 prefix are assigned and that additional endpoint devices require IPv4 addresses;

generating a new request for a new IPv4 prefix based on determining that all IPv4 addresses based on the IPv4 prefix are assigned and that the additional endpoint devices require IPv4 addresses;

including, in the new request, a new prefix delegation option identifying a new prefix identifier and a new prefix length of the new IPv4 prefix; and providing the new request to the server device.

5. The method of claim 4, further comprising:

receiving, based on the new request, the new IPv4 prefix and a new IPv4 prefix lease parameters determined based on the new prefix delegation option; and assigning new IPv4 addresses, based on the new IPv4 prefix, to the additional endpoint devices.

6. The method of claim 1, further comprising:

providing confirmation of acceptance of the WAN IP address and the IPV4 prefix to the server device; and receiving, from the server device and based on the confirmation, an indication of assignment of the WAN IP address and the IPV4 prefix.

7. The method of claim 1, further comprising:

configuring the endpoint devices with the other IPv4 prefixes.

8. A network device, comprising:

one or more memories; and one or more processors configured to:

generate a request for an Internet protocol version 4 (IPv4) prefix and a wide area network (WAN) IP address;

include, in the request, a prefix delegation option identifying a prefix identifier and a prefix length of the IPV4 prefix;

provide the request to a server device;

receive, based on the request, the WAN IP address, the IPV4 prefix, and IPV4 prefix lease parameters determined based on the prefix delegation option;

generate a plurality of IPv4 addresses based on the IPV4 prefix;

configure an interface of the network device, communicating with endpoint devices, with the IPv4 prefix;

assign a first IPv4 address of the plurality of IPV4 addresses, based on the IP+4 prefix, to the interface of the network device communicating with one or more endpoint devices; and assign ether one or more second IPv4 addresses of the plurality of IPV4 addresses to the one or more endpoint devices, wherein the network device acts as a dynamic host configuration protocol (DHCP) local server for the one or more endpoint devices.

9. The network device of claim 8, wherein the one or more processors are further to:

receive a data packet from one of the endpoint devices;

provide the data packet to the server device; and cause a policy to be applied to the data packet and the one of the endpoint devices based on providing the data packet to the server device.

10. The network device of claim 9, wherein the one or more processors are further to:

activate portal redirection services for data packets associated with the IPV4 prefix.

11. The network device of claim 8, wherein the prefix delegation option includes an option code field, a length field, a prefix identifier field, a renewal time interval field, a rebinding time interval field, a requested prefix length field, an assigned prefix length field, an IPv4 prefix field, a preferred lifetime field, and a valid lifetime field.

12. The network device of claim 11, wherein the option code field includes a code assigned to the prefix delegation option, and the prefix identifier field includes an identity association identifier for the prefix delegation option.

13. The network device of claim 11, wherein the renewal time interval includes a time interval after which the network device is to renew the IPV4 prefix, and the rebinding time interval includes a time interval after which the network device is to rebind the IPv4 prefix.

14. The network device of claim 8, wherein the request is a dynamic host configuration protocol discover, offer, request, and acknowledge (DORA) request.

15. A non-transitory computer-readable medium storing a set of instructions, the set of instructions comprising:

one or more instructions that, when executed by one or more processors of a network device, cause the network device to:

generate a request for an Internet protocol version 4 (IPv4) prefix and a wide area network (WAN) IP address;

include, in the request, a prefix delegation option identifying a prefix identifier and a prefix length of the IPV4 prefix;

provide the request to a server device;

receive, based on the request, the WAN IP address, the IPV4 prefix, and IPV4 prefix lease parameters determined based on the prefix delegation option;

provide confirmation of acceptance of the WAN IP address and the IPV4 prefix to the server device;

receive, from the server device and based on the confirmation, an indication of assignment of the WAN IP address and the IPV4 prefix;

generate a plurality of IPV4 addresses based on the IPV4 prefix;

assign a first IPV4 address of the plurality of IPV4 addresses to an interface of the network device communicating with one or more endpoint devices; and assign one or more second IPv4 addresses of the plurality of IPV4 addresses to the one or more endpoint devices, wherein the network device acts as a dynamic host configuration protocol (DHCP) local server for the one or more endpoint devices.

16. The non-transitory computer-readable medium of claim 15, wherein the one or more instructions further cause the network device to:

determine that all IPv4 addresses based on the IPV4 prefix are assigned and that additional endpoint devices require IPv4 addresses;

generate a new request for a new IPv4 prefix based on determining that all IPv4 addresses based on the IPV4 prefix are assigned and that the additional endpoint devices require IPv4 addresses;

include, in the new request, a new prefix delegation option identifying a new prefix identifier and a new prefix length of the new IPv4 prefix; and provide the new request to the server device.

17. The non-transitory computer-readable medium of claim 16, wherein the one or more instructions further cause the network device to:

receive, based on the new request, the new IPv4 prefix and new IPv4 prefix lease parameters determined based on the new prefix delegation option; and assign new IPv4 addresses, based on the new IPv4 prefix, to the additional endpoint devices.

18. The non-transitory computer-readable medium of claim 15, wherein the one or more instructions further cause the network device to:

configure the endpoint devices with the other IPv4 prefixes.

19. The non-transitory computer-readable medium of claim 15, wherein the one or more instructions further cause the network device to:

receive a data packet from one of the endpoint devices;

provide the data packet to the server device; and cause a policy to be applied to the data packet and the one of the endpoint devices based on providing the data packet to the server device.

20. The non-transitory computer-readable medium of claim 19, wherein the one or more instructions further cause the network device to:

activate portal redirection services for data packets associated with the IPV4 prefix.

* * * * *